(12) United States Patent
Angeli et al.

(10) Patent No.: US 11,718,062 B2
(45) Date of Patent: Aug. 8, 2023

(54) PERFORATED LAMINATED PRODUCT AND METHOD FOR PRODUCING THIS PRODUCT

(71) Applicant: PANTEX INTERNATIONAL S.P.A., Sulmona (IT)

(72) Inventors: Pietro Angeli, Pescara (IT); Antonio Caira, Sulmona (IT); Gianluigi Fornoni, Brusaporto (IT); Carmine Di Benedetto, Sulmona (IT)

(73) Assignee: PANTEX INTERNATIONAL S.P.A., Sulmona (IT)

( * ) Notice: Subject to any disclaimer, the term of this patent is extended or adjusted under 35 U.S.C. 154(b) by 0 days.

(21) Appl. No.: 17/518,149

(22) Filed: Nov. 3, 2021

(65) Prior Publication Data

US 2022/0055338 A1 Feb. 24, 2022

Related U.S. Application Data

(62) Division of application No. 16/522,159, filed on Jul. 25, 2019, now Pat. No. 11,186,062, which is a (Continued)

(30) Foreign Application Priority Data

Oct. 23, 2013 (IT) ................. FI2013A0254

(51) Int. Cl.
*B32B 3/30* (2006.01)
*B32B 5/02* (2006.01)
(Continued)

(52) U.S. Cl.
CPC ................. *B32B 3/30* (2013.01); *B32B 3/266* (2013.01); *B32B 5/022* (2013.01); *B32B 5/24* (2013.01);
(Continued)

(58) Field of Classification Search
CPC ........... B32B 3/30; B32B 3/266; B32B 5/022; B32B 5/24; B32B 37/02; B32B 27/12;
(Continued)

(56) References Cited

U.S. PATENT DOCUMENTS

| 4,317,792 A | * | 3/1982 | Raley | .................... B29C 51/225 264/154 |
| 5,733,628 A | * | 3/1998 | Pelkie | ................... A61F 13/513 442/293 |
| 6,132,841 A | * | 10/2000 | Guthrie | .................... B32B 3/28 239/57 |

FOREIGN PATENT DOCUMENTS

CN 1943530 A * 4/2007

OTHER PUBLICATIONS

English machine translation of CN1943530A; Apr. 11, 2007; Cai; 16 pages (Year: 2007).*

* cited by examiner

*Primary Examiner* — Linda L Gray
(74) *Attorney, Agent, or Firm* — McGlew and Tuttle, P.C.

(57) ABSTRACT

A laminated product includes an extruded film of microperforated plastic material with a vacuum perforation process having protuberances extending in a same direction from a same face of the film, with first holes having an average diameter between 100 microns and 300 microns, produced at the vertices of the protuberances, and—a layer of nonwoven fabric mechanically joined by lamination to the film on the opposite face to that on which the protuberances extend, the laminated product being perforated with second through holes having an average diameter between 300 microns and 700 microns.

9 Claims, 2 Drawing Sheets

Related U.S. Application Data division of application No. 15/031,471, filed as application No. PCT/IB2014/065503 on Oct. 21, 2014, now Pat. No. 10,406,775.

(51) Int. Cl.
*B32B 27/32* (2006.01)
*B32B 7/02* (2019.01)
*B32B 3/26* (2006.01)
*B32B 5/24* (2006.01)
*B32B 7/04* (2019.01)
*B32B 27/12* (2006.01)
*B32B 27/36* (2006.01)
*B32B 37/14* (2006.01)

(52) U.S. Cl.
CPC .................. *B32B 7/02* (2013.01); *B32B 7/04* (2013.01); *B32B 27/12* (2013.01); *B32B 27/32* (2013.01); *B32B 27/327* (2013.01); *B32B 27/36* (2013.01); *B32B 37/14* (2013.01); *B32B 3/263* (2013.01); *B32B 2555/00* (2013.01); *Y10T 156/1056* (2015.01)

(58) Field of Classification Search
CPC ....... B32B 27/32; B32B 27/327; B32B 27/36; B32B 37/14; B32B 2555/00; B32B 3/263; Y10T 156/1056
See application file for complete search history.

PERFORATED LAMINATED PRODUCT AND METHOD FOR PRODUCING THIS PRODUCT

CROSS REFERENCE TO RELATED APPLICATIONS

This application is a divisional under 37 CFR 1.53(b) of pending prior U.S. application Ser. No. 16/522,159 filed Jul. 25, 2019, which is a divisional application of U.S. application Ser. No. 15/031,471 filed Apr. 22, 2016 and claims the benefit (35 U.S.C. § 120 and 365(c)) of International Application PCT/IB2014/065503 filed Oct. 21, 2014, which designated inter alia the United States and which claims the priority of Italian Patent Application FI2013A000254 filed Oct. 23, 2013, the entire contents of each application are incorporated herein by reference.

FIELD OF THE INVENTION

The present invention pertains to flexible laminated sheets or, more in general, products, which comprise films mechanically bonded to nonwoven fabrics, perforated to enable the passage and absorption of fluids, for example to be used in products for intimate hygiene, sanitary products, etc., such as male and female sanitary napkins, diapers for infants and for incontinence, bandages, handkerchiefs, nursing pads, disposable cloths and the like.

More in particular, the subject matter of the present invention is a perforated laminated sheet or product, which comprises an extruded film of microperforated plastic material mechanically joined to a nonwoven fabric that has high "handle" properties, i.e. softness or smoothness to the touch.

The present invention also relates to a method for producing a perforated laminated sheet or product, which comprises an extruded film of microperforated plastic material joined to a nonwoven fabric.

BACKGROUND OF THE INVENTION

For some time now, the market of products related to intimate hygiene and, more in general, of sanitary products, such as sanitary napkins, diapers, bandages, handkerchiefs, disposable cloths, etc. has been demanding very high technical and "sensorial" performance.

In fact, this type of product is often required to have high capacity for fluids to pass through and, at the same time, ensure adequate absorption of these fluids, without leaving a feeling of dampness.

Moreover, another fundamental aspect is linked to the need to ensure that this product is pleasant to the touch for the user at the interface between product and area in contact with the user.

At the same time, these products must ensure adequate robustness during use, while maintaining a particularly non "invasive" and light appearance.

To date, the products existing on the market are unable to fully satisfy all these requirements at the same time and, in particular, are unable to simultaneously ensure adequate softness to the touch and adequate permeation of fluids.

From the point of view of production, the technologies that can be used to manufacture these products are many, at times apparently equivalent to one another. For example, there are many ways of joining layers of different materials and of producing holes in these materials. However, the large number of procedures with which these methods can be joined to one another give results that can vary even greatly and which are somewhat unsatisfactory.

SUMMARY OF THE INVENTION

The object of the present invention is to produce a perforated laminated sheet or product, which comprises an extruded film of microperforated plastic material mechanically joined to a nonwoven fabric, with a high "handle", or softness to the touch, and which enables adequate passage of fluids through its thickness.

Another important object of the present invention is to produce a perforated laminated product, which comprises an extruded film of microperforated plastic material mechanically joined to a nonwoven fabric, which is strong and stable, while having low basis weights.

A further important object of the present invention is to produce a perforated laminated product, which comprises an extruded film of microperforated plastic material mechanically joined to a nonwoven fabric, which ensures adequate absorption thereof without leaving a feeling of dampness.

Yet another important object of the present invention is to provide a method for producing a perforated laminated sheet or product, which comprises an extruded film of microperforated plastic material joined to a nonwoven fabric, having a high "handle", or softness to the touch that enables adequate passage of fluids through its thickness, and high strength and stability with low basis weights.

One more important object of the present invention is that of providing a method for producing a perforated laminated sheet or product, which comprises an extruded film of microperforated plastic material joined to a nonwoven fabric, which is economical.

These and other objects, which will be more apparent below, are achieved with a laminated product according to the present invention and with a method according to the present invention.

According to a first aspect, the invention therefore relates to a laminated product that comprises a film, preferably extruded, of microperforated plastic material preferably perforated with a vacuum perforation process having protuberances extending in a same direction from a same face of said film, with first holes having an average diameter (for example measured in normal conditions) between 100 microns and 300 microns, more preferably between 170 microns and 240 microns and even more preferably between 185 microns and 226 microns, produced on the vertices of said protuberances, and a layer of nonwoven fabric mechanically joined by lamination to said film on the opposite face to that on which said protuberances extend, said laminated product being perforated with second through holes having an average diameter between 350 microns and 700 microns and more preferably between 470 and 600 microns.

According to another aspect, the invention also relates to a method for manufacturing a laminated product formed by an extruded film of plastic material provided with protuberances that extend from one face thereof with micro-holes having an average diameter between 100 microns and 300 microns, more preferably between 170 microns and 240 microns and even more preferably between 185 microns and 226 microns, produced on the vertices of said protuberances, and by a layer of nonwoven fabric; this method comprises lamination and simultaneous through perforation, in a calender provided with a first rotating cylinder with a smooth surface and a second rotating cylinder provided with cusps on the surface, of said film arranged with the protuberances facing said second cylinder, and of said layer of nonwoven fabric facing said first cylinder; lamination takes place with a peripheral speed of said second cylinder greater than the peripheral speed of said first cylinder, so that there is slippage between the two surfaces of said cylinders that causes said perforation to produce through holes with an average diameter between 350 microns and 700 microns and more preferably between 470 microns and 600 microns.

The term "microhole" or "microperforated" in the present text is intended as a hole of small dimensions, for example approximately between 100 microns and 300 microns.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
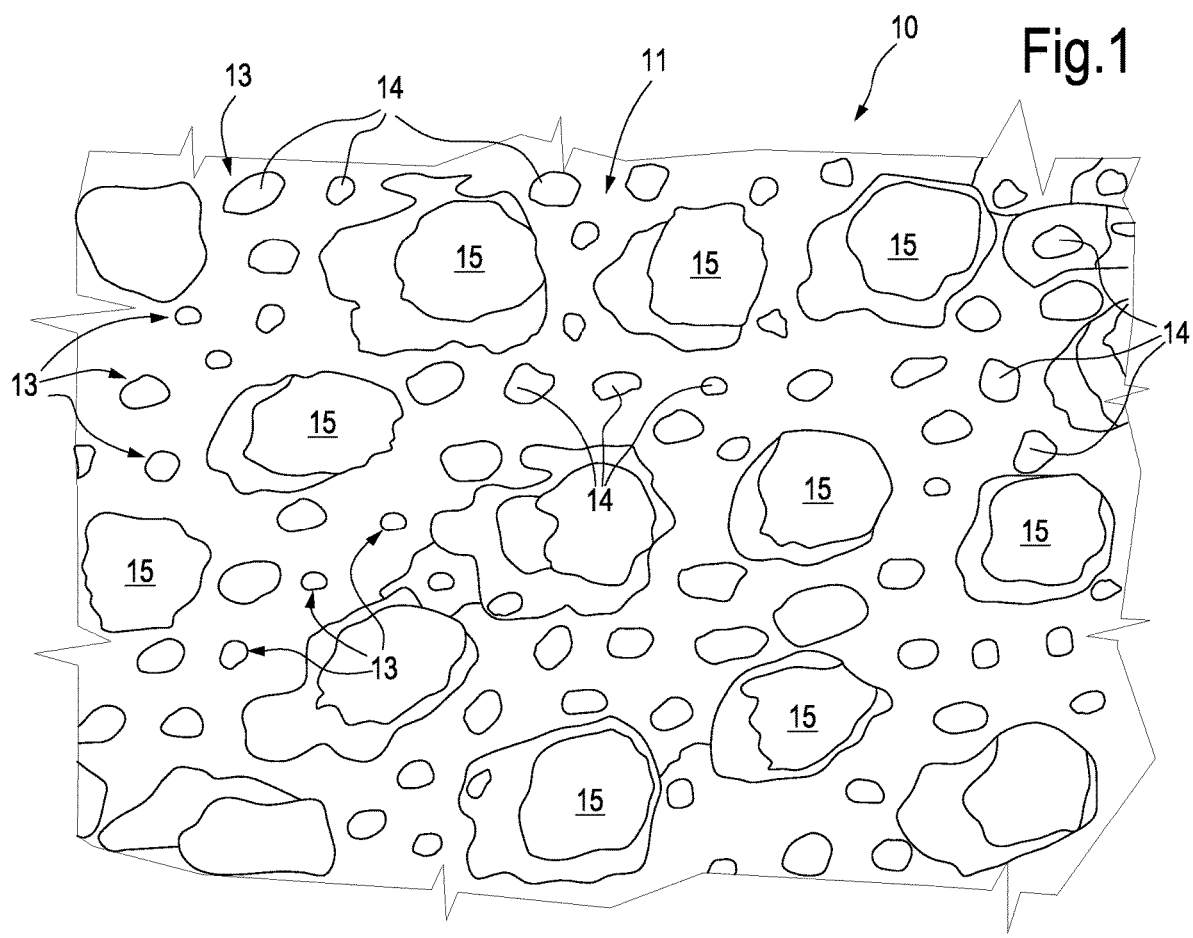
FIG. 1 is a top view of a cropped photograph relating to the portion of laminated sheet or product according to the invention.
Figure 2:
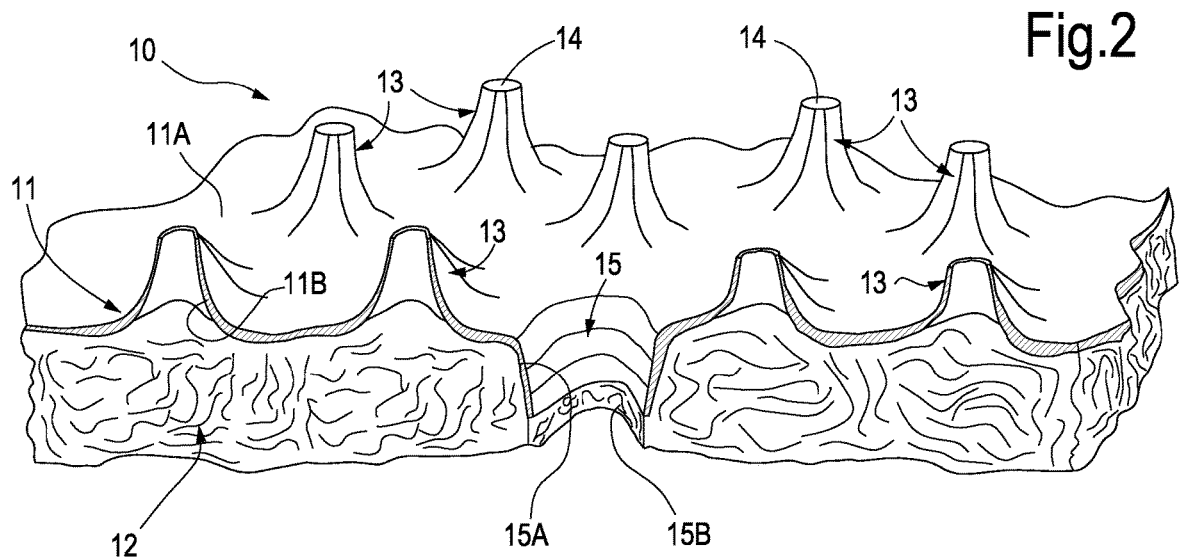
FIG. 2 is a schematic transverse cross-sectional view of a portion of product as in FIG. 1.

With reference to the aforesaid FIGS. 1 and 2, a portion of laminated product according to the invention is indicated as a whole with the number 10.

This laminated product 10 substantially comprises two layers, a first layer formed by a film 11, of plastic material, microperforated, and a second layer formed by a nonwoven fabric 12 mechanically joined to the film (i.e. without the use of an interface of adhesive type), by lamination, as will be better explained below.

More in particular, the film 11 has an array or plurality of protuberances 13 that extend from a face 11A thereof, in a manner on average orthogonal to this face, each of which has a respective first hole 14 at the vertex thereof. In practice, these protuberances are small tubes that protrude from the face 11A and place this face in fluid communication with the other face 11B. For example, these protuberances are truncated-cone shaped, i.e. are convergent channels; in this sense, truncated-cone shaped can also be intended as a geometric shape that is not necessarily precise, but in which it is possible to identify both a base and a vertex having a curved shape (in plan view), for example similar to a circular, ellipsoidal hole, etc., and in which the area of the base is greater than the area of the vertex.

The average thickness of the film 11, measured between the vertices of the protuberances and the second face 11B, is preferably between 200 microns and 440 microns and more preferably between 280 microns and 360 microns. The average thickness of the film 11 in the spaces between the protuberances (excluding the protuberances) is preferably between 5 microns and 20 microns and more preferably between 8 and 12.5 microns.

The measurements of the thicknesses and of the average diameters are taken in normal conditions example 20° C. and 1 atm.

These holes 14 are produced with vacuum perforation technology, of known type, better explained below, which enables extension of the perforated protuberances to be obtained.

As known, this perforation technology enables different shapes of protuberances and of holes to be obtained, which can therefore have circular, polygonal, star-shaped, curvilinear sections, etc.

The dimensions of these first holes 14 have an average diameter between 100 microns and 300 microns and more preferably between 180 microns and 230 microns. Considering the deforming effects of the step for forming the appendages and of the subsequent lamination step, diameter is intended as the value of the average diameter of the hypothetical circle having the same area as the hole (for example, the "open area" of a certain portion of product, i.e. the total area of the "voids" on the product—the holes—are measured by means of an optical system and then, by counting the number of holes/cm$^2$, the average area of each hole and consequently the average diameter is obtained).

The surface density of first holes 14 is preferably between 300 holes/cm$^2$ and 600 holes/cm$^2$, and more preferably between 400 cm$^2$ and 500 cm$^2$.

The plastic materials that can form the film are for example based on Polyethylene (PE), and more preferably chosen from the following: linear low density polyethylene (LLDPE), metallocene linear low density polyethylene (mLLDPE), low density polyethylene (LDPE), high density polyethylene (HDPE).

The layer of nonwoven fabric is produced, for example, with fibers or filaments that preferably comprise one or more of the following materials: polypropylene (PP), polyethylene (PE), linear polyethylene, polyethylene terephthalate (PET), polylactic acid (PLA). Naturally, other plastic materials can also be used.

Advantageously, the layer of nonwoven fabric has hydrophobic properties or is treated to have hydrophobic properties (i.e. the fibers or filaments have these properties) much to the advantage of preventing return of the absorbed fluid toward the surface of the film 11, much to the advantage of feeling dry and masking stains on the product.

In other embodiments the layer of nonwoven fabric or the fibers or filaments thereof can be hydrophilic or have other properties, according to the product requirements.

For example the fibers or filaments are of the type with two components (for example PP/PE, PET/PE) or with one component (PP, PLA etc.). Naturally, other plastic materials could also be used.

Preferably, the nonwoven fabric is made of carded fibers made integral with one another in the passage through a calender. Otherwise, the layer of nonwoven fabric can be produced using spunbonded technique, i.e. produced with continuous filaments made integral with passage through a calender, or even with spunlace technique, in which the fibers are bonded by means of jets of water.

This layer of nonwoven fabric is mechanically joined by lamination to the face 11B of the film 11, i.e. the face opposite the one from which the protuberances 13 extend. Each of the protuberances 13 is closed on the face 11B of the film 11 via the layer of nonwoven fabric 12.

The laminated sheet or product 10 has second holes 15 passing through the whole thickness of the product. These holes are produced during the lamination step that joins film and layer of nonwoven fabric and have larger dimensions than the first holes 14. Preferably, these second holes 15 have an average diameter between 350 microns and 700 microns and more preferably between 470 microns and 600 microns. Also in this case the diameter indicated is the value of the average diameter of the hypothetical circle that has the same area as the hole (for example, the open area of a certain portion of product, i.e. the total area of the voids on the product—the holes—is measured by means of an optical system and then, counting the number of holes/cm$^2$, the average area of each hole and therefore the average diameter is obtained).

Advantageously, the number of said second holes is between 30 and 70 per cm$^2$, preferably between 45 and 55, and more preferably approximately equal to 50.

The second holes are produced during the lamination step and substantially each comprise a "collar" 15A that extends from the second face 11B of the film 11 and is inserted in the thickness of the layer of nonwoven fabric. This collar 15A preferably does not pass through the whole of the thickness of the layer of nonwoven fabric but finishes slightly before this, leaving a small band 15B of nonwoven fabric to define the end mouth of the hole. This collar enables integration and union between film 11 and layer of nonwoven fabric 12 to be increased, acting also as adhesion point of the film on the nonwoven fabric and vice versa. Moreover, it enables the quality and the speed of passage of the fluids through the product to be improved, also producing a conveyor for the fluids.

The average thickness of the layer of nonwoven fabric 12 is preferably between 70 microns and 400 microns, and more preferably between 100 microns and 220 microns and measured in the spaces between the second holes 15, while the weight of this layer is between 6 gsm and 18 gsm. The layer preferably also has a linear fiber density between 1 and 3 denier.

In total, the average thickness of the laminated sheet or product 10, per surface unit, is preferably between 300 microns and 700 microns and more preferably between 400 microns and 550 microns. Advantageously, the weight of this laminated product is preferably between 15 gsm and 40 gsm and more preferably between 18 and 30 gsm.

The ratio between average thickness of the layer of nonwoven fabric 12 (measured in the spaces between the second holes 15) and the average thickness of the film 11 (measured in the spaces between the protuberances, excluding the protuberances) is preferably between 9 and 25 and more preferably between 12.5 and 17.6.

Besides enabling optimal passage of the fluids through the product, the second holes 15 combined with the first holes 14 make it possible to give the structure of the product a less "rigid" consistency.

The structure of the laminated sheet or product thus described has a high "handle" or softness to the touch.

The protuberances, which are in contact with the user's skin, enable the total contact surface to be reduced, much to the advantage of feeling dry and reducing the feeling of "stickiness".

A standardized method of measuring the sensorial quality of the softness of the face 11A of the laminated product with the protuberances, and the related measurement obtained in relation to the product 10, are proposed below by way of example.

The measurement method consists in the tactile sensory evaluation of the softness (or smoothness) also defined as "Softness Panel Test". To prevent visual contact, the method selected was a closed box, into which the panelists can insert their hands to implement the tactile tests on the product, thereby detecting the sensorial properties, in this case softness. For the softness criterion a range of values from 1 to 5 was indicated (1 rough-5 very soft/smooth) for each panelist to attribute to the product evaluated.

The test samples are prepared by fixing identical portions of laminated sheet or product 10 to identical backings, preferably related to the type of final product for which the laminated product is intended, in the current case a sanitary napkin in the case in hand the topsheet was removed from the sanitary napkin and replaced with the product being tested. Naturally, all the test samples must be produced in the same way, using the same structure and size.

The number of samples is the same as the number of panelists (preferably at least ten).

Before starting the test, the interviewer numbers the samples and decides the order for comparison.

One at a time, the samples are touched by the panelists, who will give their evaluation.

The values defined by the panelists are registered on a sheet indicated below, together with any observations made by the interviewer regarding the method with which the sample was tested.

At the end of the test, the data obtained are processed statistically (mean, standard deviation, coefficient of variation) and the product specification is attributed.

The rough data obtained from the test of two different products are indicated below: a first product "A" according to the example described above and according to the process specifications indicated later in the invention, and a different second product "B" that has the same purposes of use, having a similar structure at the interface part with the user, i.e. a film of microperforated plastic material with protuberances provided with microholes.

TABLE 1

Softness Panel Test Results

| Panelist | Evaluation Sample A | Evaluation Sample B |
|---|---|---|
| 1 | 5 | 4 |
| 2 | 4 | 2 |
| 3 | 5 | 1 |
| 4 | 4 | 2 |
| 5 | 5 | 3 |
| 6 | 3 | 2.5 |
| 7 | 4 | 3 |
| 8 | 4 | 1 |
| 9 | 4 | 2 |
| 10 | 4 | 3 |
| 11 | 4 | 3 |
| mean | 4.2 | 2.4 |

(1 rough-5 very soft/smooth)

From the data indicated it can be noted, regardless of the comparison to sample B, how sample A of the product according to the invention, produced with the method according to the invention was given very high values of softness/smoothness. The particular structure of the product is able to prevent the fluid absorbed from returning to the surface, improving the dry feeling and thus masking any stains caused by body fluids, such as urine, or stains caused by the female menstrual cycle. This effect is enhanced, for example, by the use of a nonwoven fabric made of hydrophobic material.

Figure 3:
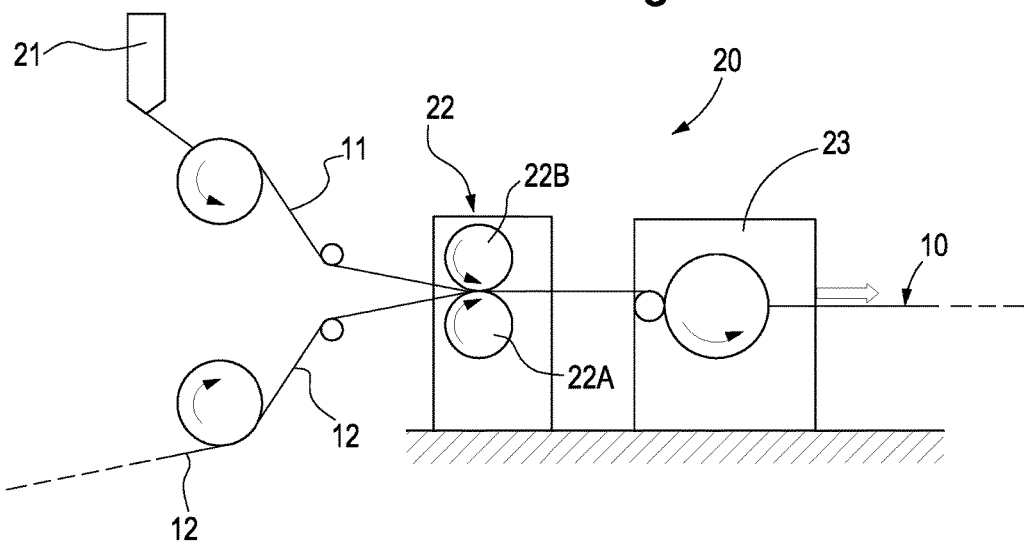
FIG. 3 is a diagram of a system for implementing a method for producing a product according to the invention.
Figure 4:
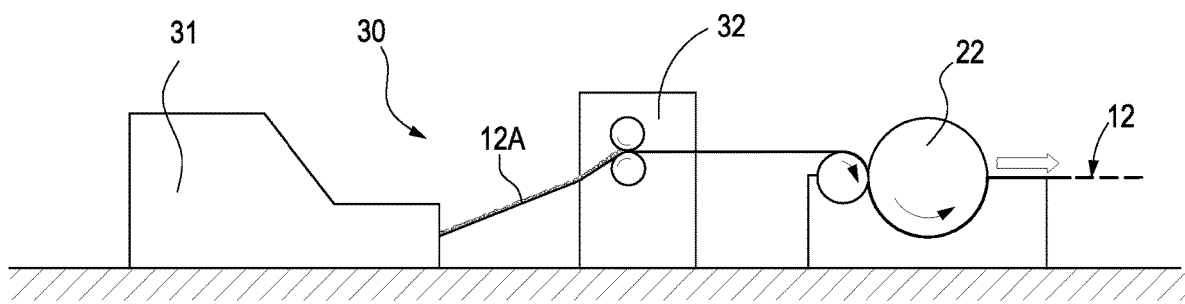
FIG. 4 is a diagram of a portion of a system for implementing a method for producing a product according to the invention.

FIG. 3 shows a system 20 that implements a method for producing a product as described above, composed of apparatus and devices of known type, combined in an original manner.

There is provided an apparatus 21 for extrusion and vacuum perforation of the film 11. The film is produced with a flat head extrusion process and comes into contact with a rotating cylindrical "perforated mesh". The mesh rubs on a groove for the whole of its width, through which a strong vacuum is created.

When the strip of extruded product, still in molten state (i.e. soft, or not yet solidified), i.e. the precursor of the film (i.e. film in molten state), comes into contact with the mesh and passes over the groove, holes are formed in the film at the openings of the mesh due to the vacuum.

Vacuum perforation can also use different processes to the one described above. The shape of the protuberances and soft effect resulting from the use of vacuum perforation is optimal.

In other embodiments, the film can be microperforated by a technique using needles or jets of water, of known type.

The film is produced continuously and moved continuously, i.e. in the same line, towards a perforation and lamination calender 22. In other embodiments, the film 11 can be produced not in line with the calender 22, or can be produced separately, by extrusion and vacuum perforation and subsequently suitably wound in a reel (for example by means of a "slit-winder") and then used unwound continuously at the entrance to the calender 22.

The average thickness of the film 11, before entering the calender 22, i.e. before being joined to the layer of nonwoven fabric 12, is preferably between 200 microns and 440 microns and more preferably between 280 microns and 360 microns, measured between the vertices of the protuberances 13 and the second face 11B, while in the spaces between the protuberances 13 (excluding the protuberances) it is preferably between 5 microns and 20 microns and more preferably between 8 microns and 12.5 microns.

Simultaneously, the layer of nonwoven fabric 12 is moved continuously by a reel in which it is stored. For example, the layer of nonwoven fabric can be produced on an apparatus 30 (see FIG. 3) that comprises a carding machine 31 that produces an unconsolidated layer of fibers 12A, which subsequently passes continuously through a consolidating calender 32 that consolidates the layer of fibers to produce the layer of nonwoven fabric, which can subsequently be cut to size in a slit-winder to produce the final layer 12, which is then wound in a reel. In other embodiments the layer of nonwoven fabric can be produced and moved continuously toward the perforating calender 22 without being wound in a reel, i.e. the forming apparatus of the layer of nonwoven fabric can be in line with the calender 22.

The average thickness of the layer of nonwoven fabric 12, before entering the calender 22, i.e. before being joined to the film 11, is preferably between 70 microns and 400 microns, and more preferably between 100 microns and 220 microns, measured in the spaces between the second holes 15; the layer preferably also has a linear fiber density between 1 and 3 denier. The layer of nonwoven fabric has a weight preferably between 6 gsm and 18 gsm.

Film 11 and layer of nonwoven fabric 12 enter the calender 22 together, for example with the film 11 superimposed on the layer 12, in the same machine direction.

The calender 22 is provided with a first rotating cylinder 22A with a smooth surface and a second rotating cylinder 22B, provided with a plurality of cusps on the surface (not shown in the figures).

The film 11 enters the calender 22 so as to be arranged between the layer of nonwoven fabric and the second rotating cylinder 22B. Consequently, the layer of nonwoven fabric 12 enters the calender 22 so as to be arranged between film 11 and first smooth cylinder 22A. Moreover, the film 11 enters the calender 22 so that its protuberances 13 are facing the second cylinder 22B.

The two cylinders 22A and 22B rotate in opposite directions (as in any calender) but with different peripheral speeds, and in particular the peripheral speed of the first cylinder 22A is greater than the peripheral speed of the second cylinder 22B, so that there is slippage between the two surfaces of the cylinders that causes the perforation to produce the second through holes 15 with average diameter as described above.

Preferably, between the two cylinders there is a lamination pressure between 90 and 250 N/mm, and more preferably between 120 and 170.

Therefore, the film 11 and the layer of nonwoven fabric 12, passing through the calender are made integral with each other, simultaneously producing holes that pass through both, producing a laminate with the structure described above.

Preferably, the film 11 reaches the calender "cold", i.e. with a temperature between 10° C. and 45° C. Cooling of the film from the extrusion and perforation apparatus 21 to the calender can take place in air or with the use of cooling means, such as cooling rollers (they are wound on cold rollers), jets of air, etc. (list cooling means). Having the extrusion and perforation of the film 11 in line with the calender 22 is particularly advantageous, as it enables the temperature of the film entering to be suitably and accurately controlled.

Advantageously, the surface temperature of the second cylinder 22B is preferably between 70° C. and 220° C. The surface temperature of the second cylinder 22B is preferably 90° C. or less.

In combination with these temperatures, the surface temperature of the first cylinder 22A is preferably between 75° C. and 240° C.

With regard to the shape of the cusps, this can vary greatly, and for example can be truncated-cone shaped. Preferably, the vertices of these cusps are flat. Truncated-cone shaped is intended as a geometric shape that is not necessarily precise, but in which it is possible to identify both a base and a vertex having a curved shape (in plan view), for example similar to a circular, ellipsoidal hole, etc., and in which the area of the base is greater than the area of the vertex.

Advantageously, the number of cusps per surface unit ($cm^2$) is between 30 and 70 per $cm^2$, more preferably between 45 and 55, and even more preferably approximately around 50.

Once the product has been laminated and perforated in the calender, it can be wound in a reel, for example by means of a "slit-winder" 23.

From the viewpoint of production, the method for producing the laminate is able to obtain a microperforated product, which preserves the microholes (naturally where no macroholes are present) during the process, produces well-defined through perforations and at the same time enables a layer of nonwoven fabric to adhere to the film, maintaining softness and giving the laminate properties of strength, lightness and stability.

This result cannot be obtained with prior art methods, as it is not possible to obtain products with such high softness, absorption and masking properties by joining two components mechanically. Conventionally, glues are used, increasing the costs, stiffening the product and decreasing the fluid acquisition properties.

While specific embodiments of the invention have been shown and described in detail to illustrate the application of the principles of the invention, it will be understood that the invention may be embodied otherwise without departing from such principles.

What is claimed is:

1. A method comprising:
   forming a laminated product comprising a film of microperforated plastic material and a layer of nonwoven fabric, said film of microperforated plastic material having protuberances extending in a same direction from a same face of said film, with first holes having an average diameter between 100 microns and 300 microns, produced at vertices of said protuberances, each of said protuberances comprising an outer surface adapted to contact a surface of a user of said laminated product, said layer of nonwoven fabric being joined by lamination to said film on an opposite face to that on which said protuberances extend, said laminated product being perforated with second through holes having an average diameter between 350 microns and 700 microns, each of said protuberances being closed on said opposite face of said film via said layer of nonwoven fabric.

2. A method according to claim 1, wherein said layer of nonwoven fabric comprises a plurality of nonwoven fabric through holes, each of said nonwoven fabric through holes being located in an area of one of said second through holes, a portion of said layer of nonwoven fabric defining a portion of one of said nonwoven fabric through holes, wherein said portion of said layer of nonwoven fabric is free of said film of microperforated plastic material.

3. A method comprising:
   forming a laminated product comprising a film of microperforated plastic material and a layer of nonwoven fabric, said film of microperforated plastic material comprising a user contact side adapted to contact a user of said laminated product and a nonwoven contact side, said user contact side comprising an outer surface, said outer surface defining a plurality of protuberances extending in a same direction, a plurality of plastic material holes and a plurality of plastic material through holes, each of said plurality of plastic material through holes being located at a spaced location from said plurality of plastic material holes, each of said protuberances comprising a user contact surface for contacting said user of said laminated product, wherein a portion of said outer surface extends between one of said protuberances and another one of said protuberances, said user contact surface defining one of said plastic material holes on one side of a respective protuberance of said protuberances, each of said plurality of plastic material holes comprising a plastic material hole diameter, each of said plurality of plastic material through holes comprising a through hole diameter, each said through hole diameter being greater than each said plastic material hole diameter, said layer of nonwoven fabric comprising an outer nonwoven fabric surface and a plastic material contact surface located opposite said outer nonwoven fabric surface, said plastic material contact surface being joined by lamination to said nonwoven contact side of said film, each of said protuberances being closed on said nonwoven contact side of said film via said layer of nonwoven fabric.

4. A method according to claim 3, wherein said plurality of plastic material holes are produced at vertices of said protuberances, said plastic material hole diameter being between 100 microns and 300 microns, each said through hole diameter being between 350 microns and 700 microns.

5. A method according to claim 4, wherein a number of said through holes is between 30 and 70 holes/cm$^2$ and a total average thickness of said laminated product is between 300 microns and 700 microns.

6. A method according to claim 4, wherein each of said protuberances extends in a direction away from said layer of nonwoven fabric, each of said protuberances comprising a protuberance outer surface, each said protuberance outer surface being located at a spaced location from said layer of nonwoven fabric.

7. A method comprising:
   forming a laminated product comprising a film of microperforated plastic material and a layer of nonwoven fabric, said film of microperforated plastic material having protuberances extending in a same direction from a same face of said film, said protuberances comprising first holes, said first holes having an average diameter between 100 microns and 300 microns, each of said protuberances comprising an outer surface configured to contact a surface of a user of said laminated product, said layer of nonwoven fabric being joined by lamination to said film on an opposite face to that on which said protuberances extend, said laminated product comprising second holes, said second holes having an average diameter between 350 microns and 700 microns, each of said protuberances being closed on said opposite face of said film via said layer of nonwoven fabric.

8. A method according to claim 7, wherein said first holes are produced at vertices of said protuberances.

9. A method according to claim 8, wherein said layer of nonwoven fabric comprises a plurality of nonwoven fabric through holes, each of said nonwoven fabric through holes being located in an area of one of said second holes, a portion of said layer of nonwoven fabric defining a portion of one of said nonwoven fabric through holes, wherein said portion of said layer of nonwoven fabric is free of said film of microperforated plastic material.

* * * * *